United States Patent
Antila et al.

(12) 
(10) Patent No.: US 6,660,099 B2
(45) Date of Patent: Dec. 9, 2003

(54) CHROMATOGRAPHIC FRACTIONATION OF VEGETABLE MATERIAL

(75) Inventors: Tapio Juhani Antila, Espoo (FI); Timo Väkeväinen, Kirkkonummi (FI); Christina Lindqvist, Kantvik (FI); Hannu Koivikko, Kantvik (FI); Matti Tylli, Kantvik (FI); Juho Jumppanen, Surrey (GB)

(73) Assignee: Danisco Sugar Oy, Espoo (FI)

( * ) Notice: Subject to any disclaimer, the term of this patent is extended or adjusted under 35 U.S.C. 154(b) by 55 days.

(21) Appl. No.: 10/091,891

(22) Filed: Mar. 6, 2002

(65) Prior Publication Data

US 2002/0150652 A1 Oct. 17, 2002

Related U.S. Application Data

(63) Continuation of application No. PCT/FI00/00779, filed on Sep. 15, 2000.

(30) Foreign Application Priority Data

Sep. 17, 1999 (FI) .................................................. 991985

(51) Int. Cl.[7] ................................................ C08B 37/06
(52) U.S. Cl. ............................... 127/34; 536/2; 536/128
(58) Field of Search ............................... 127/34; 536/2, 536/128

(56) References Cited

U.S. PATENT DOCUMENTS

| | | | |
|---|---|---|---|
| 4,816,078 A | * | 3/1989 | Schiweck et al. .............. 127/36 |
| 5,008,254 A | | 4/1991 | Weibel |
| 5,250,306 A | | 10/1993 | McCleary et al. |
| 5,660,872 A | | 8/1997 | Van Loo et al. |
| 6,447,614 B1 | * | 9/2002 | Kuusisto et al. ............... 127/29 |

FOREIGN PATENT DOCUMENTS

| | | |
|---|---|---|
| DE | 43 13 549 C1 | 10/1994 |
| JP | 56 011 903 | 2/1981 |
| SE | 453 511 | 2/1988 |
| WO | WO 99/10542 | 3/1999 |
| WO | WO 99/19365 | 4/1999 |

OTHER PUBLICATIONS

CAPLUS AN 1976:137563, Yoshitake et al, "Purification of pectin extract . . . ", Nov. 1975.*
Chemical Abstract., vol. 52, (1958), no month provided, ref. viite 18230g.
Chemical Abstract., vol. 55 (1961), no month provided, ref. 22994i.
Chemical Abstract., vol. 67 (1967), no month provided, ref. 12777e.
Cheng L. et al., "Effect of Cations on the Elution of Pectic Polysaccharides from Anion–Exchange Resins", *Analytical Biochemistry* 228:109–114 (1995) no month provided.
Chemical Abstract., vol. 123, (1995), no month provided, ref. viite 137780.

* cited by examiner

*Primary Examiner*—David Brunsman
(74) *Attorney, Agent, or Firm*—Scully, Scott, Murphy & Presser (57) ABSTRACT

The invention relates to chromatographic fractionation of pectin-containing vegetable material, such as sugar beet pulp. In the method of the invention, a pectin-containing hydrolysate is chromatographically separated into a pectin fraction, a salt fraction and a sugar fraction. The method is carried out by using a cation exchange resin, which is preferably in the form of a multivalent metal.

28 Claims, 5 Drawing Sheets

CHROMATOGRAPHIC FRACTIONATION OF VEGETABLE MATERIAL

This application is a Continuation of International Application PCT/FI00/00779 filed Sep. 15, 2000 which designated the U.S. and was published under PCT Article 21(2) in English.

BACKGROUND OF THE INVENTION

The invention relates to chromatographic treatment of pectin-containing vegetable material, such as sugar beet pulp. The invention relates particularly to separating pectin and pectic sugars/oligomers and simultaneously salts from pectin-containing vegetable material by using chromatographic fractionation.

Pectin is a commonly used additive in food industry. It is useful, for example, as a stabilizing agent, thickener and gelling agent in, for example, jams and other fruit-based products as well as in sour milk-based products, such as yoghurts.

For the separation of pectin, the vegetable material used as a starting material, such as sugar beet pulp, is first brought into a soluble form by using, for example, acidic or basic hydrolysis. During the hydrolysis, salts are introduced into the solution which are usually undesired in the final pectin product and which should thus be removed.

Pectins have conventionally been produced from apples, sugar beet pulp or the citrus peel by first extracting soluble polymers with acid, whereafter the obtained solution is filtered and concentrated and the pectins are precipitated with alcohol or metal salts at a suitable pH. Free sugars remain in the alcohol-water solution. Since the amounts of solvent utilized in the method are large, the sugar content in the alcohol-water solution is extremely low.

U.S. Pat. No. 4,816,078 (Süddeutsche Zucker-Aktiengesellschaft) describes the recovery of L-arabinose from sugar beet pulp or other vegetable material by basic hydrolysis, the L-arabinose being subsequently chromatographically purified. U.S. Pat. No. 5,250,306 (British Sugar PLC) discloses the recovery of araban from sugar beet pulp by first using basic hydrolysis and then ultrafiltration. In the basic hydrolysis according to this publication, pectin is destroyed and only sugars can be recovered.

WO 99/10542 (Cultor Corporation) describes the recovery of L-arabinose from sugar beet pulp using chromatographic separation with a cation exchanger in a monovalent metal form. This process includes, as a preceding step, extraction of sugar beet pulp with a strong alkaline solution. The use of strong alkali destroys pectin compounds, whereby only sugars are recovered.

JP Patent 56 011 903 (Chisso Corporation) describes the use of ultrafiltration for separating "crude" pectin from vegetable material. The starting material is first treated with hydrochloric acid at a pH 2.5 to 3.0, and pectin is extracted at a temperature of 85° C. The obtained product is purified by filtration, and the filtrate is ultrafiltrated by using a membrane having a cutoff size of 6000 to 20 000 Da.

U.S. Pat. No. 5,008,254 (Weibel, M. K.) discloses a method wherein fast acidic hydrolysis is conducted at a high temperature (120° C.) for a short period of time (six seconds) in order to recover a pectin-sugar mixture from sugar beet pulp. The hydrolyzed mixture containing sugars and some pectin compounds is concentrated by ultrafiltration (cut-off size 30 000 Da). Said fast acidic hydrolysis is extremely complex technically, and the insoluble fibres which remain when the acidic hydrolysis is used tend to disintegrate into colloidal mass which is difficult to filter.

DE Patent Specification 4 313 549 (Herbstreich & Fox KG Pektin FA) describes a method of preparing a pectin-containing extract from sugar beet material. In the method, the raw material is hydrolyzed with a citric acid solution at a temperature varying between 50° C. and the boiling temperature of the solution.

U.S. Pat. No. 5,660,872 (Raffinerie Tirlemontoise S. A.) describes a method of chromatographic fractionation of a polydispersed saccharide composition. The method relates particularly to separating inulin fractions. The inulin-containing material to be treated may be obtained from, for example, vegetable material such as chicory root. The raw material is first brought into a soluble form and subsequently into the form of a metastable solution by adjusting the temperature of the solution below the solubility temperature without the solution being agglomerated. The solution in the metastable form is chromatographically fractionated into a fraction of high molecular weight free from saccharides of low molecular weight (polymerization degree 2 or less, preferably 5 or less), and a fraction of low molecular weight free from saccharides of high molecular weight (polymerization degree higher than 5). The method is unable to separate salts from saccharide components.

Chem. Abstr., vol 123 (1995), ref. 137780 describes the recovery of pectic polysaccharides from vegetable material, such as apple and and citrus fruit, using anion-exchange columns. The reference does speak anything about the simultaneous recovery of salts and sugars. Chem. Abstr. vol. 55 (1961), ref. 22994i describes chromatographic fractionation of polysaccharides, such as a mixture of sugar beet araban and citrus pectin, using sellulose anion exchangers. In the alkaline conditions used in connection with the anion exchangers, pectin is easily destroyed.

Chem. Abstr., vol. 67 (1967), ref. 12777e relates to the use of ion exchangers in the production of beet pectin. In this process, metal salts are removed from sugar beet pulp hydrolysate.

SE-B 453511 (Nils Monten) describes the preparation of a pectin product from sugar beet pulp using an anion exchanger. The anion exhanger is used for purification purposes, not for separating pectin from oligomeric and monomeric sugars. The product is thus a mixture of pectin polysaccharides and oligomeric and monomeric sugars.

WO 99/19365 (Korea Institute of Science and Technology) relates to the preparation of a therapeutic composition including galacturonic acid (pectin), arabinose and galactose. In this process, pectin and other desired components are precipitated with ethanol from an aqueos extract of Angelica gigas Nakai followed by treating the pectin precipitate with an anion exchange resin. This process requires the use of an organic solvent (ethanol).

DEFINITIONS RELATED TO THE INVENTION

In connection with the present invention, pectins refer to polysaccharide compounds of high molecular weight being composed of partly methylated polygalacturonic acid chains (polygalacturonic acid content at least 65%). Pectin also contains araban, galactan and xylose side chains attached to the polygalacturonic acid chain, and rhamnoses interrupting the continuous polygalacturonic acid chain. Furthermore, the galacturonic acid groups of sugar beet pectin are partly acetylated.

In connection with the present invention, the expression "pectin-containing vegetable material" refers to any pectin-containing material obtained from plants. The pectin-containing vegetable material is typically obtained from sugar beet, citrus fruit or apples.

In connection with the present invention, pectic sugars/oligomers refer to polysaccharides, oligosaccharides and mono- and disaccharides, such as arabans of low molecular weight, arabino-oligomers, arabinose, galactans, galactose, galacto-oligomers, rhamnose and fucose, which are present together with pectin in the pectin-containing vegetable material. The mixture to be treated may also contain small amounts of sucrose, glucose and fructose.

In connection with the present invention, sugar beet pulp refers to pulp which is obtained in connection with the production of sugar and which remains after sugar extraction and from which the sugars have to a large extent been extracted.

In connection with the present invention, a sugar beet pulp hydrolysate refers to hydrolyzed sugar beet pulp which contains pectins and special sugars as well as salts to be separated and which is in the form of a solution.

In connection with the present invention, salts refer to small-molecular ionized substances, typically to inorganic small-molecular ionized substances such as sodium salts, potassium salts and calcium salts. Typically, the salts are the sodium, potassium and/or calcium salts of inorganic acids, such as hydrochloric acid, sulphuric acid and/or nitric acid. These are typically in salt form in a neutralized solution and in ion form in an acidic solution. The salts mainly originate from the pretreatment, such as acidic or basic hydrolysis and potential neutralization, of pectin-containing vegetable material, such as sugar beet pulp.

BRIEF DESCRIPTION OF THE INVENTION

The method of the invention has been successfully used for separating pectins and pectic sugars/oligomers into separate products while salts have simultaneously been removed from the pectins and pectic sugars/oligomers. The method in its entirety is conducted in an aqueous solution. This enables inflammability and toxicity problems relating to the use of organic solvents, such as isopropanol and ethanol, to be avoided.

Since the separation method of the invention is, in addition to size exclusion, also based on ion exclusion and/or ion retardation, the ion contents of different fractions can be controlled at the same time. In addition to separating ions, a resin regenerated to an ion form acts as a cation exchanger, removing cations (e.g. crome, iron) contained in the feed solution by exchanging them for the ions of the regenerated resin. The cut-off limits for the collection of fractions in the chromatographic separation can be determined so as to control the composition of different fractions.

Objects of the invention are achieved by a method which is characterized by what is set forth in the independent claims. Preferred embodiments of the invention are disclosed in the dependent claims.

DETAILED DESCRIPTION OF THE INVENTION

In the following description of the invention, pectin contents, salt contents and concentrations of special sugars are set forth as calculated from the dry solids content of the pectin-containing solution introduced into a chromatographic column, and, correspondingly, of the dry solids content of the fractions obtained from the chromatographic separation.

The invention relates to a method of treating pectin-containing vegetable material which is in the form of a pectin-containing aqueous solution. The invention is based on the fact that the pectin-containing solution is introduced into a chromatographic column including a cation exchange resin and separated into a fraction having a higher pectin content than the pectin-containing solution introduced into the chromatographic column, and into at least one fraction, using water as the eluant. This gives a fraction enriched with pectins (pectin fraction) and at least one other fraction.

Said pectin fraction may comprise one or more pectin-containing fractions, depending on the desired narrowness of the molecular weight distribution for the pectin product.

In a first embodiment of the invention, the aforementioned at least one other fraction comprises a fraction having a higher salt content than the pectin-containing solution introduced into the chromatographic column. In addition to the fraction enriched with pectins, this gives a fraction enriched with salts (salt fraction).

This embodiment of the invention preferably utilizes a cation exchange resin in the form of a multivalent metal, such as a resin in $Ca^{2+}$ or $Al^{3+}$ form. In addition to a pectin fraction, the pectin-containing solution is separated into a fraction having a higher salt content than the pectin-containing solution introduced into the chromatographic column. The pectin fraction is recovered. This gives a pectin product which is purified from salts and which is usually as such ready to be further processed without additional purification. The other fraction (the one having higher salt content than the pectin-containing solution introduced into the chromatographic column) contains the salts and special sugars. The salts can be further removed from this fraction, by using, for example, membrane filtration to give a special sugar product purified from salts.

In a second embodiment of the invention, the aforementioned at least one other fraction comprises a fraction having a higher salt content than the pectin-containing solution introduced into the chromatographic column, and a fraction/fractions having a higher concentration of special sugars than the pectin-containing solution introduced into the chromatographic column. In addition to a fraction enriched with pectins, this gives a fraction enriched with salts (salt fraction) and a fraction/fractions enriched with pectic sugars/oligomers (pectic sugar/oligomer fraction/fractions).

In this embodiment of the invention, the pectin-containing solution is, in addition to a pectin fraction, separated into a salt fraction and a pectic sugar/oligomer fraction/fractions, and the pectin fraction and the pectic sugar/oligomer fraction/fractions are recovered. The pectin fraction and the pectic sugar/oligomer fraction/fractions can thus be separated with one chromatographic treatment. If desired, the pectic sugar/oligomer fraction/fractions can be further fractionated. This embodiment of the invention is also preferably carried out with a separation resin in the form of a multivalent metal, such as a resin in $Ca^{2+}$ or $Al^{3+}$ form.

In a third embodiment of the invention, the aforementioned at least one other fraction comprises a fraction/fractions having a higher concentration of pectic sugars/oligomers than the pectin-containing solution introduced into the chromatographic column. In addition to a fraction enriched with pectins, this gives a fraction/fractions enriched with pectic sugars/oligomers (pectic sugar/oligomer fraction/fractions).

In this embodiment of the invention, the pectin-containing solution is separated into a pectin fraction and a pectic sugar/oligomer fraction/fractions, and the pectin fraction and the pectic sugar/oligomer fraction/fractions are recovered. The pectic sugar/oligomer fraction/fractions, e.g. an arabinose fraction, are pure when obtained, but the pectin fraction still contains salts. This embodiment of the invention preferably utilizes a separation resin in the form of a monovalent metal, such as a resin in $Na^+$ form, or a resin in $H^+$ form. The salts are then removed from the pectin fraction by using, for example, ion exchange or membrane filtration or other chromatographic treatment with a separation resin in the form of a multivalent metal ($Ca^{2+}$, $Al^{3+}$).

The water-soluble pectin material for the chromatographic separation is obtained, for example, by extraction from sugar beet pulp or another pectin-containing raw material by using acidic or mild basic hydrolysis. This gives a hydrolysate containing pectins, pectic sugars/oligomers and salts. Dry solids are typically separated from the hydrolysate by filtration and clarification to give a clear, pectin-containing solution for the chromatographic separation. Besides filtration, centrifugation, spinning or mechanical clarifying treatment may also be used. The final clarification of the solution can also be carried out by "pre-coat" filtration by using a suitable additional filtration agent.

When sugar beet pulp is used as the raw material, the hydrolysis is typically carried out with acid to give an acidic sugar beet pulp hydrolysate. The hydrolysis is typically conducted at a temperature less than 100° C., e.g. at 75° C. at a normal pressure with, for example, hydrochloric acid, sulphuric acid or nitric acid, typically at a pH of about 1.5. The hydrolysis time may be three hours, for example. Dry solids are separated from the hydrolysate e.g. by filtration, centrifugation, spinning or mechanical clarifying treatment to give a clear, pectin-containing solution.

In case a base is used for the hydrolysis, the hydrolysis is carried out in mild conditions at relatively low temperatures, such as 0 to 30° C., typically at a pH of 10–13.

The hydrolysate thus obtained is used as the pectin-containing solution to be introduced into a chromatographic column.

The dry solids content of the pectin-containing solution introduced into the chromatographic column is typically 1 to 20%, preferably 2 to 10%, most preferably 1.5 to 5%.

The pH of the pectin-containing solution introduced into the chromatographic column is typically less than 5, preferably less than 4, most preferably between 1.5 and 3.

The chromatographic fractionation of the invention is typically carried out at a temperature of 40 to 90° C., preferably 50 to 80° C., and most preferably 65 to 80° C.

The chromatographic fractionation of the invention uses water as the eluant.

The chromatographic fractionation is carried out by using a separation resin based on size exclusion, ion exclusion and/or ion retardation. The size exclusion separates pectins of high molecular weight from sugars of lower molecular weight and salts. The sugars of lower molecular weight are adsorbed in the resin and are separated from pectin. Typically, the first fraction to be obtained from the chromatographic column is the pectin fraction, and the sugars of low molecular weight and salts are obtained as the second fraction.

The ion exclusion, in turn, prevents ionic compounds (in the present invention mainly the ions of the acid used for the hydrolysis) from being introduced into the solid phase (resin).

The ion retardation refers to the slow movement of the ionizing substances through the chromatographic column.

When a resin in the form of a monovalent ion ($H^+$, $Na^+$) is used, the ions (salts) are eluted from the columns partly in the same retention volume as the high-molecular pectin. Hence, the monosaccharide fraction which is eluted later is free from ions to give an extremely pure monosaccharide fraction (pectic sugar/oligomer fraction). In this embodiment, the pectin fraction contains some ions, The pectin fraction can then be purified to be free from ions (salts) by using a membrane technique or ion exchange technique.

When a resin in the form of a di- or trivalent ion ($Ca2+$, $Al^{3+}$) is used, the ions are not equally strongly excluded outside the resin, which causes the retention time of the ions in the solution introduced to the chromatographic column to increase; consequently, this gives a purer pectin fraction. With the resin in $Ca^{2+}$ form, the ions are eluted between the compounds of high molecular weight and the compounds of low molecular weight (between pectin and sugars). With the resin in Al form, the ions are eluted partly in the same fraction as the monosaccharides or after them, which gives a very pure pectin fraction.

The chromatographic separation is carried out with a cation exchange resin, preferably with a strong cation exchange resin. The cation exchange resin may be, for example, a cross-linked styrene-divinylbenzene copolymer resin which can be in $Na^+$ or $H^+$ form or in the form of a multivalent metal cation, such as in $Ca^{2+}$, $Mg^{2+}$, $Pb^{2+}$ or $Al^{3+}$ form.

When as pure pectin as possible is desired, the resin is preferably in the form of a multivalent metal, such as in aluminium ($Al^{3+}$) form.

The degree of cross-linking of the cation exchange resin is typically 3 to 12% DVB, preferably 4 to 8% DVB, and the particle size 0.1 to 2 mm, preferably 0.2 to 0.4 mm.

The pectin fraction and the fraction/fractions containing pectic sugars/oligomers are recovered from the chromatographic treatment. The pectin fraction is typically obtained first and the sugar fraction/fractions subsequently. If desired, these main fractions can be further purified.

The fractions obtained from the chromatographic treatment, particularly the pectin fraction, can be purified by ion exchange, for example. The treatment is then preferably carried out with a combination of a strong cation exchanger and a weak anion exchanger. The ion exchange removes potential salts, for example. The ion exchange can also be used for purifying the sugar fractions obtained.

The acidic pectin solution can also be neutralized partly or completely with metal salts or hydroxides (e.g. NaOH) after the chromatographic treatment, typically during the ion exchange step. The pectin (pH 3 to 4.5) partly neutralized as metal salts represents the stablest form of pectin, so the neutralization treatment also improves the stability of pectin.

The method of the invention may also comprise a step of membrane filtration either before or after the chromatographic fractionation. Potential salts can be removed by ultrafiltration. When the ultrafiltration is carried out after the chromatographic separation, it is typically performed on the pectin fraction but it can also be performed on the sugar fractions. The ultrafiltration is typically carried out by using a cut-off size of 1000 to 30 000 Da, preferably 10000 to 30000 Da.

Ultrafiltration as a pretreatment in chromatographic fractionation is particularly well suited to raw materials containing a large quantity of salts, in which case at least some of the undesired salts can already be removed in this step.

The method of the invention may also comprise treatment with an adsorbent either before or after the chromatographic treatment, in which case the adsorbent treatment is performed on the pectin-containing solution introduced into the chromatographic column or on a fraction obtained from the chromatographic separation. Activated carbon or adsorbent resin is typically used as the adsorbent. The adsorbent treatment removes colour and potential off-flavours.

The molecular weight of the sugar beet pectin obtained by the method of the invention varies between 10 000 and 60 000 Da. The clarity of the product (measured from a 1% pectin solution as transmittance at a wave length of 655 nm) is 92 to 98%, which is considerably higher than that of common commercial pectins (38.5 and 39.2%). The solubility of the product is also good. The ferulic acid content of the product is 0.4 to 0.8% as calculated on the dry solids.

The pectin in the form of a solution thus obtained can be modified chemically. The pectin can be cross-linked, for example. The crosslinking, which is preferably covalent cross-linking, can be carried out by using, for example, an oxidase such as laccase.

The purified pectin solution thus obtained can be dried to a commercial product. The drying is typically carried out as spray drying or roll drying. If necessary, the dried pectin can be powdered, agglomerated to a granular form and sieved into a suitable particle size. The final pectin product is packed and stored in a dry place. The pectin can also be concentrated with a sugar solution into a stable sugar-pectin solution which can as such be used as a stabilizing agent in juices.

The desired pectic sugars/oligomers of low molecular weight, such as arabans, arabino-oligosaccharides and arabinose, are recovered from the pectic sugar/oligomer fraction/fractions of the chromatographic separation. The sugars are obtained in the form of a sugar solution, which can be concentrated into syrup (dry solids content 50 to 60%, for example) or which can be further purified and fractionated as described above or by using other methods.

The method of the invention typically utilizes sugar beet material as the starting material, but citrus- or apple-based material as well as soy material can also be used.

When a sugar-beet-based raw material is used as the starting material, it is preferable that the material is biologically preserved sugar beet pulp. This is typically obtained by lowering the pH of the pulp to a value of 3.5 to 4.5 and by subsequently storing the pulp in substantially oxygen-free conditions. WO 99/10384 describes the preparation of biologically preserved sugar beet pulp.

The biologically preserved sugar beet pulp is typically obtained by treating fresh, pressed-out sugar beet pulp from which the sugars have been extracted and which has a dry solids content of about 20 to 25 wt % such that the pH is lowered to about 4, preferably by mixing a suitable acidic solution into the pulp. Organic acids, such as formic acid, lactic acid, acetic acid and/or mixtures thereof are efficient and easy to use. There are also commercial acid mixtures available, such as "Ensimax", which consists of formic acid and lignosulphonate, and silage acid (AIV acid), which mainly consists of formic acid. The treatment is preferably carried out immediately after the pressing, when the pulp has a temperature of about 60° C. The acid-treated pulp, which has a pH of about 4, is preferably packed in an airtight manner, e.g. in a plastic bag or a plastic tube, and left to stabilize.

The method of the invention can also utilize dried sugar beet pulp as the raw material, the dried sugar beet pulp being brought into the form of a solution by using hydrolysis in the above-described manner.

The invention further relates to pectin products and pectic sugar/oligomer products obtained by the method of the invention.

In the following, the invention will be described by using detailed but non-restrictive examples.

In the following examples, the resin used for the chromatographic separations was Korela V06C resin (manufactured by Finex Oy, Finland). Meeting foodstuff quality standards, this is a gel-type, sulphonated, cross-linked (4% DVB) polystyrene-divinylbenzene copolymer resin and a strong cation exchanger. The average particle size of the resin is 0.25 mm and the capacity 1.08 equiv./dm$^3$. The resin was used either in hydrogen or metal form.

The resins used in the ion exchange were strong cation exchangers, e.g. Purolite C 150 TL (manufactured by Purolite Ltd., the USA), and weak anion exchangers, e.g. Purolite A 103 S (manufactured by Purolite Ltd., the USA). The cation exchanger was regenerated with hydrochloric acid, and the anion exchanger with sodium hydroxide. The ion exchange operations were carried out at room temperature.

The analytic methods used in the examples were as follows:

galacturonic acid: a spectrophotometric method (Blumenkrantz, N & Asboe-Hansen, G., New method for quantitative determination of uronic acids, Anal. Biochem., 54 (1973) 484 to 489) or HPLC;

mono- and oligosacchadides: HPLC, Pb$^{++}$;

the dry solids content and weight percentages of the solutions: measurement of the refractive index of the solutions (Index Instruments Automatic Refractometer GRP 11-37);

conductivity: standard conducting meter (Radiometer CDM92);

pH: Radiometer PHM92;

the molecular weights of recovered polymers: gel permeation chromatography.

EXAMPLE 1

Preparation of a Sugar Beet Pulp Hydrolysate Used as the Starting Material (for the Fractionation of Examples 2 to 5)

(1) Preparation of Biologically Preserved Sugar Beet Pulp

Fresh, pressed-out, sugar-free sugar beet pulp (1000 kg) having the dry solids content of about 22% was treated with 4 liters of commercial acid mixture "Ensimax" (manufactured by Kemira Oy, Finland). The acid mixture contained 30 wt-% of formic acid (85-%), 20 wt-% of acetic acid (80-%), and 50 wt-% of lignosulphonate (37-%). While being mixed, the temperature of the sugar beet pulp was 50 to 60° C., and the mixing was conducted for about one minute, in a screw mixer. The mixture was packed in a tight plastic bag which was manufactured from a 0.25 mm polyethene film. The pulp was left to cool and stabilize outdoors, and the bags were stored outdoors.

(2) Hydrolysis of Sugar Beet Pulp

Sugar beet pulp treated in the above-described manner and preserved for four months was used as the starting material. For the acidic hydrolysis, 17 kg of sugar beet pulp (2.89 kg of dry solids) was mixed with 70 liters of ion-exchanged water (85° C.), and the pH of the solution was adjusted with HCl to a value of 1.5. After three hours, the hydrolysis was stopped by cooling.

After the hydrolysis, the dry solids were separated first by filtration through a steel wire net, and, subsequently, the solution was clarified by using bag and disc filters. The dry solids content, i.e. the concentration of soluble components, of the clear filtrate was 2.1%. These soluble components include pectin of high molecular weight and arabino-oligomers of low molecular weight, L-arabinose and salts.

EXAMPLE 2

Chromatographic Separation of Pectin and Polysaccharides with Resin in $Na^+$ form, and Purification of Pectin by Ultrafiltration The starting material was a sugar beet pulp hydrolysate obtained in a similar manner to that described in Example 1 except that the hydrolysis was carried out with $HNO_3$. The hydrolysate contained 2.8% of dry solids.

The hydrolysate was subjected to chromatographic separation in a column containing a sulphonated polystyrene-divinylbenzene copolymer resin having a cross-linking degree of 4%. The chromatographic separation was carried out in the following conditions: resin in $Na^+$ form, average diameter of resin particles 0.25 mm, height of the resin bed 1.7 m, diameter of the column 9.5 cm and temperature 65° C., bed volume 11.9 $dm^3$, flow rate 50 ml/min, feed volume 1000 ml, pH of the feed solution 1.5, conductivity of the feed solution 12.3 mS/cm, dry solids content of the feed solution 2.8%, eluant=water.

Figure 1:
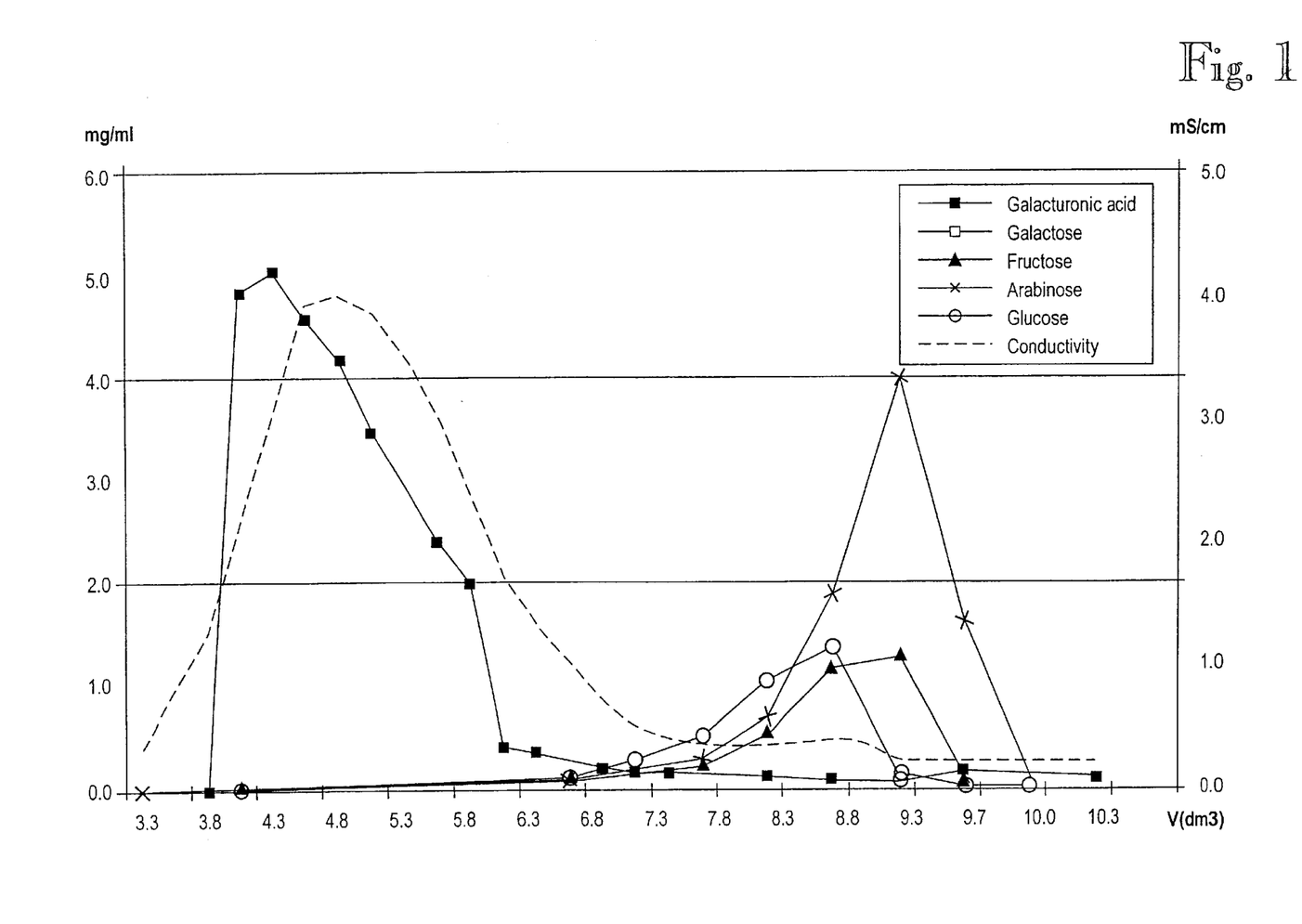
FIG. 1 shows the results of the chromatographic separation of the product or Example 1 using a resin in $Na^+$ form.

The results of the chromatographic separation are shown in FIG. 1. The first fraction collected from retention volumes 4 to 6 contained polygalacturonic acid (pectin) and ionic molecules (salts). The sugars of low molecular weight, in turn, were in the second fraction comprising retention volumes 7 to 10.

Pure pectin was obtained from the pectin fraction (volumes 4 to 6) by separating the salts by ultrafiltration. The ultrafiltration was carried out with AN620 polyacryl-nitrile membrane (manufactured by PCI) at a temperature of 50 to 60° C. The cut-off point of the membrane was 25 000 Da.

The permeate contained the salts and other components of low molecular weight, and the concentrate contained the pectin of higher molecular weight. The dry solids content of the concentrate was about 4 to 5%.

EXAMPLE 3

Chromatographic Separation of Pectin and Polysaccharides with Resin in $H^+$ form, and Purification of Pectin by Ion Exchange The sugar beet pulp hydrolysate used as the starting material was prepared in a similar manner to that described in Example 1 except that the hydrolysis was carried out with $HNO_3$. The dry solids content of the hydrolysate was 1.9%. The resin used in the chromatography was similar to that in Example 2 except for being in $H^+$ form. The chromatographic separation was carried out in otherwise similar conditions to those in Example 2 except that the conductivity of the solution was 7.5 mS/cm and pH 2.0.

Figure 2:
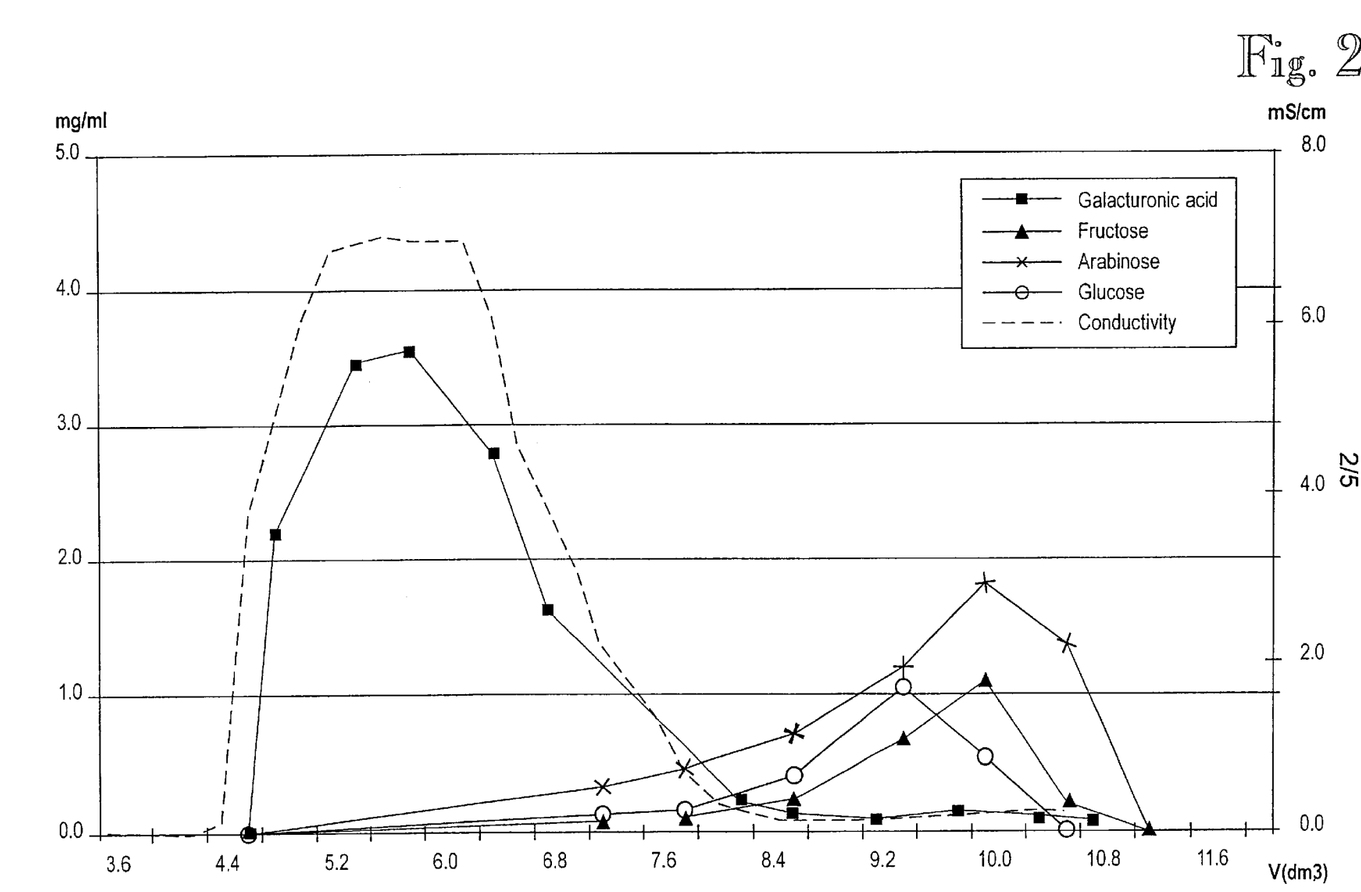
FIG. 2 shows the results of the chromatographic separation of the product of Example 1 using a resin in $H^+$ form.

The results of the chromatographic separation are shown in FIG. 2. The polygalacturonic acid (pectin) and the salts were eluted in the first fraction containing volumes 4 to 7.5. The sugars of low molecular weight were eluted in volumes 8 to 10.

The pectin fraction eluted from the column was further purified by removing the salts by ion exchange by using a combination of a strong cation exchanger and a weak anion exchanger. The strong cation exchanger was Purolite C 150 TL and the weak anion exchanger was Purolite A 103 S. The combined system of cation exchange and anion exchange removed both the cations and the anions from the solution. The purified pectin solution was recovered.

EXAMPLE 4

Separation of Pectin and Polysaccharides Chromatographically with Resin in $Ca^{++}$ Form The sugar beet pulp hydrolysate used as the starting material was produced in a similar manner to that described in Example 1 except that the hydrolysis was carried out with sulphuric acid. The obtained hydrolysate was neutralized to pH 4.0. The chromatographic resin was otherwise the same as in Example 2 except for being in $Ca^{++}$ form. The chromatographic separation was carried out in otherwise similar conditions to those in Example 2 except that the conductivity of the hydrolysate was 5.3 mS/cm, pH was 4 and the flow rate 50 ml/min.

Figure 3:
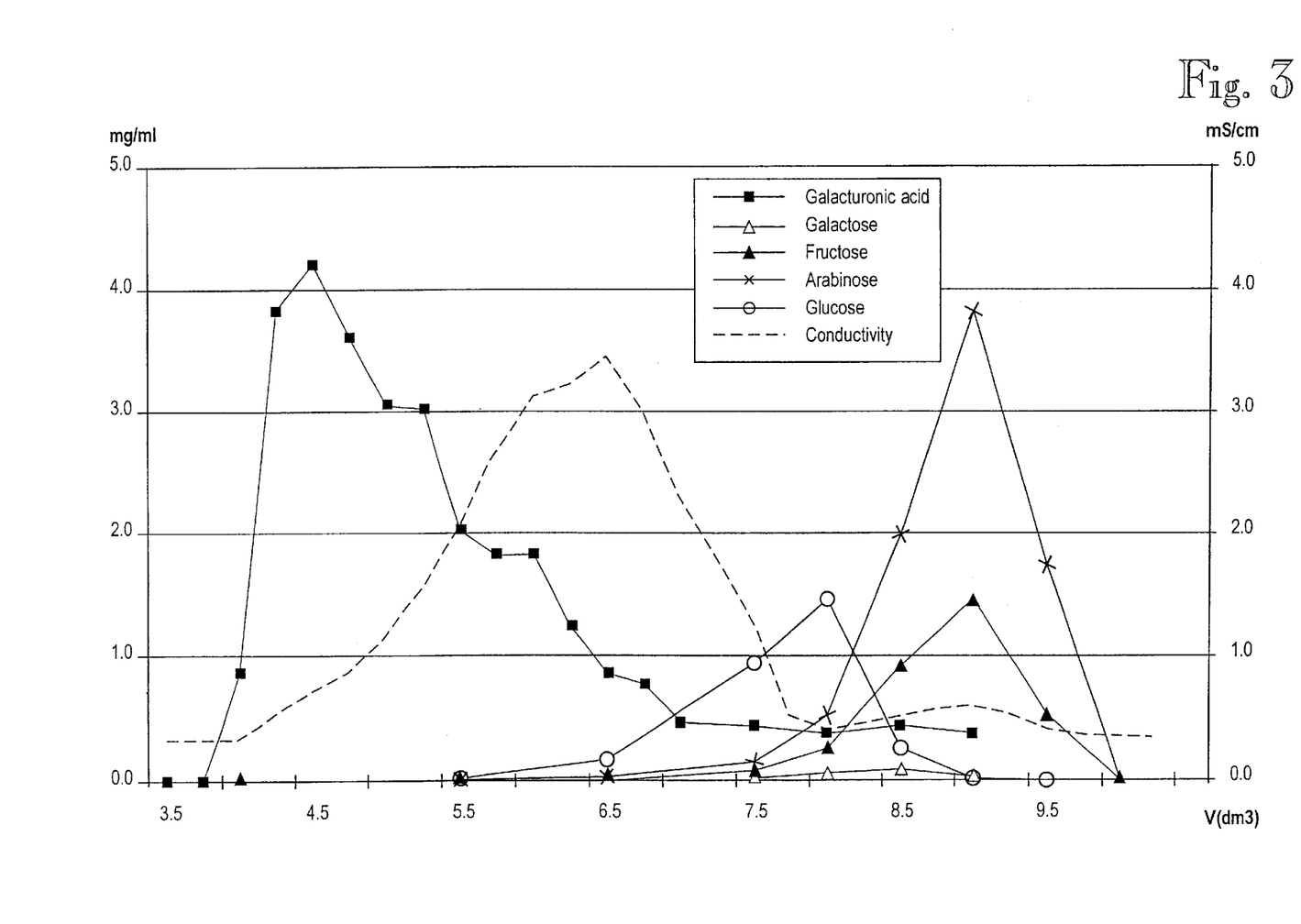
FIG. 3 shows the results of the chromatographic separation of the product of Example 1 using a resin in $Ca^{2+}$ form.

The results are shown in FIG. 3. The fraction which was eluted first (volumes 3.5 to 5.5) contained most of the pectin, the next fraction (volumes 5.5 to 7.5) contained the salts, and the third fraction (volumes 8 to 10) contained the sugars. The separation gave pure pectin and a pure sugar solution containing L-arabinose.

The pectin fraction was concentrated, and the pectin was spray dried.

The sugar solution was concentrated into a syrup having a dry solids content of 50 to 60%. The obtained syrup as such can be used as an aroma precursor, for example, or it can be further fractionated.

EXAMPLE 5

Separation of Pectin and Polysaccharides with Resin in $Al^{3+}$ Form

A sugar beet pulp hydrolysate prepared in a similar manner to that in Example 1 (hydrolysis was carried out with sulphuric acid at a pH of 1.5 at a temperature of 75° C. for 2.5 hours) was used as the starting material. The hydrolysate was ion-exchanged by using IMAC C 16 cation exchange resin regenerated to hydrogen form. The cation exchange resin was neutralized with KOH to a pH value of 2.9. The dry solids content indicated by the refractive index was 1.6% and the conductivity 8.6 mS/cm.

The chromatographic fractionation was carried out in a column which was 1 m in height and 4.5 cm in diameter. The separation utilized Korela VO6C resin (volume 1 liter, 4 DVB-%, dp=0.25 mm). The bed volume was 0.75 l and the feed volume 80 ml.

The resin was subjected to back-washing and regenerated to hydrogen form with three bed volumes of 5-wt-% hydrochloric acid, and washed with ion-exchanged water. The regeneration to aluminium form was carried out by first introducing three bed volumes of 10-wt-% aluminium sulphate solution through the resin bed (1 bed volume/hour) and, subsequently, at the same flow rate, 1.5 bed volumes of 10-wt-% aluminium sulphate solution having the pH adjusted to a value of 1.5. The resin was washed with ion-exchanged water (8 to 10 bed volumes).

Figure 4:
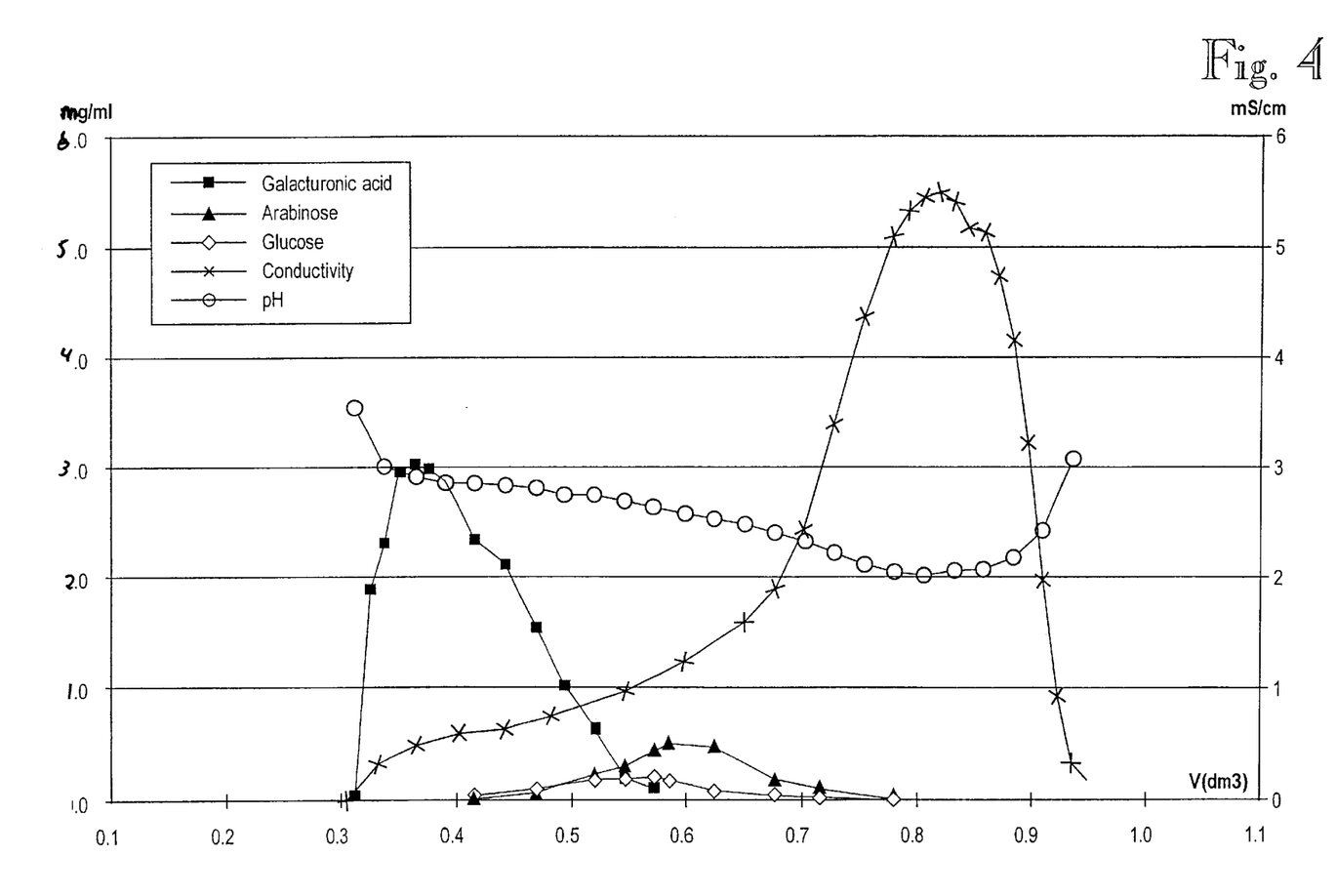
FIG. 4 shows the results of the chromatographic separation of the product of Example 1 using a resin in $Al^{3+}$ form.

The temperature of the chromatographic separation was 70° C. and the flow rate of the separation was 13 ml/min. The pectin hydrolysate was heated to the separation temperature before introducing it into the column. The collection of the fractions was started 15 minutes after the pectin hydrolysate had been introduced into the column, and samples were taken at intervals of one minute. The result of the separation is shown in FIG. 4.

The figure shows that the pectin material of high molecular weight is, due to size exclusion, eluted in retention volume of 0.3 to 0.5 l. The conductivity curve indicates that most of the ions in the solution introduced into the column are, eluted between 0.5 to 0.8 l. The retention volume of monosaccharides is between about 0.4 to 0.7 l.

The separation of the pectin material and the ions was similar to that in the trial conducted with the separation resin in $Ca^{2+}$ form, but the pectin and the ions were separated much better, i.e. the resolution was much higher, with the resin in $Al^{3+}$ form.

EXAMPLE 6

Separation of Citrus Pectin and Apple Pectin

A solution containing a mixture of citrus pectin and apple pectin was used as the starting material. The solution was prepared by dissolving in water 0.5 g of commercial H&F Instant CJ204 pectin preparation (manufactured by Herbstreich & Fox KG) and 0.5 g of Herbapekt SF01 pectin preparation (manufactured by Herbstreich & Fox KG), adding 0.5 g of glucose and 0.5 g of sodium sulphate.

The chromatographic separation was conducted in similar conditions to those in Example 5.

Figure 5:
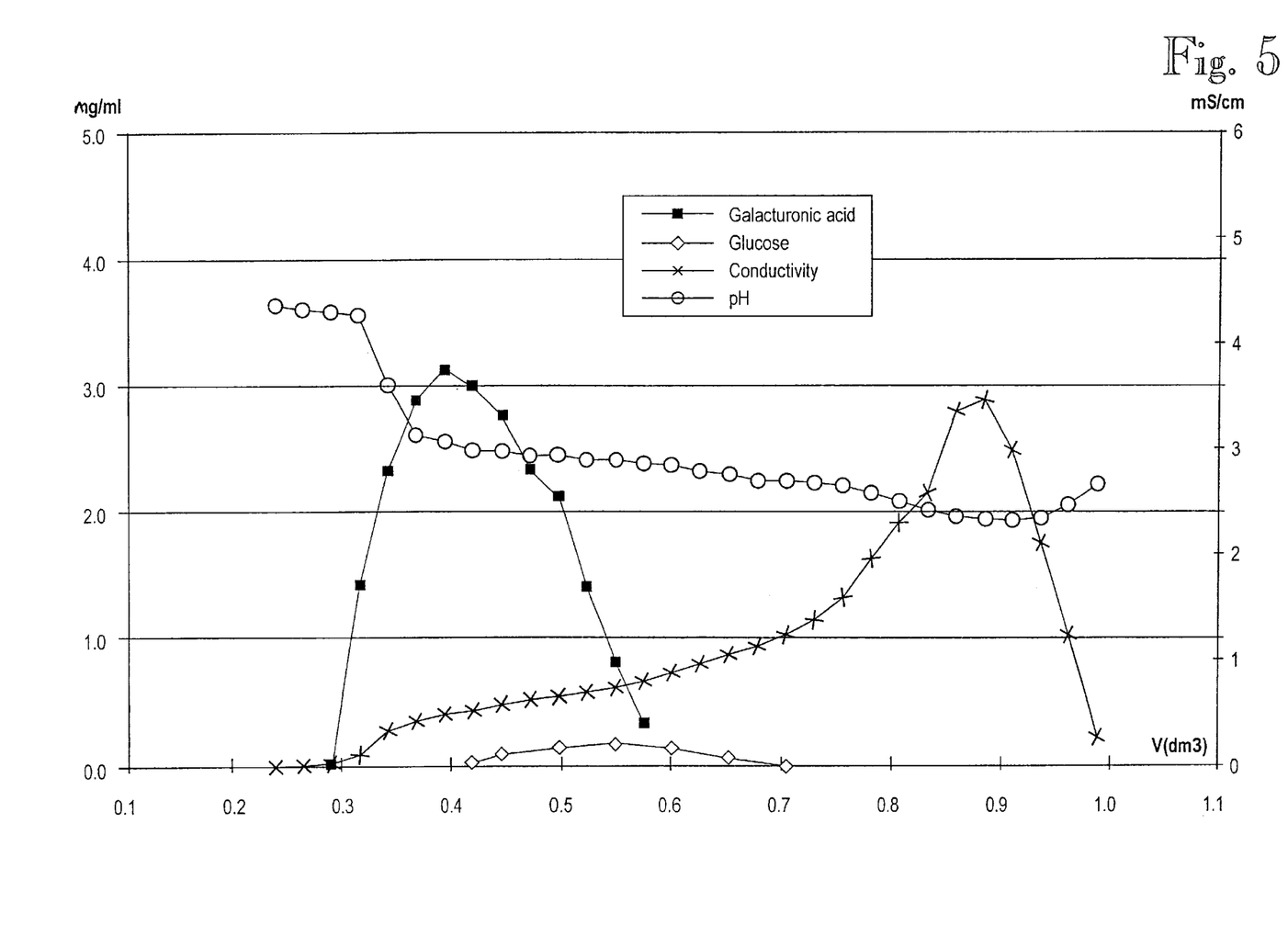
FIG. 5 shows the results of the chromatographic separation of the product of Example 6 using a resin in $Al^{3+}$ form.

The results of the trial are shown in FIG. 5. The results indicate that also a raw material obtained from apples and citrus fruit can be fractionated into pectin fractions and salt fractions by utilizing the method of the invention.

It is obvious to one skilled in the art that as technology advances, the basic idea of the invention can be implemented in many different ways. The invention and its embodiments are thus not restricted to the examples described above but they can vary within the scope of the claims.

What is claimed is:

1. A method of treating pectin-containing vegetable material which is in the form of a pectin-containing aqueous solution, comprising introducing the pectin-containing solution into a chromatographic column including a cation exhange resin and separating the pectin-containing solution into a fraction having a higher pectin content than the pectin-containing solution introduced into the chromatographic column, and into at least one other fraction, using water as the eluant.

2. A method according to claim 1, wherein said at least one other fraction comprises a fraction having a higher salt content than the pectin-containing solution introduced into the chromatographic column.

3. A method according to claim 1, wherein said at least one other fraction comprises a fraction having a higher salt content than the pectin-containing solution introduced into the chromatographic column, and a fraction/fractions having a higher concentration of pectic sugars/oligomers than the pectin-containing solution introduced into the chromatographic column.

4. A method according to claim 1, wherein said at least one other fraction comprises a fraction/fractions having a higher concentration of pectic sugars/oligomers than the pectin-containing solution introduced into the chromatographic column.

5. A method according to any one of claims 1–4, wherein the chromatographic separation is carried out with a cation exchange resin based on size exclusion, ion exclusion and/or ion retardation.

6. A method according to any one of claims 1 to 3, wherein the chromatographic separation is carried out with a cation exchange resin in the form of a multivalent metal.

7. A method according to claim 6, wherein the metal is $Ca^{2+}$ or $Al^{3+}$.

8. A method according to claim 1 or 4, wherein the chromatographic separation is carried out with a cation exchange resin in $H^+$ form.

9. A method according to claim 1 or 4, wherein the chromatographic separation is carried out with a cation exchange resin in $Na^+$ form.

10. A method according to claim 1, wherein the chromatographic separation is carried out with a strong cation exchange resin.

11. A method according to claim 10, wherein the cation exchange resin is a cross-linked styrene-divinylbenzene copolymer resin.

12. A method according to claim 11, wherein the degree of cross-linking of the resin is 3 to 12% DVB, preferably 4 to 8% DVB.

13. A method according to claim 1, wherein the resin particle size is 0.1 to 2 mm, preferably 0.2 to 0.4 mm.

14. A method according to claim 1, wherein the dry solids content of the pectin-containing solution introduced into the chromatographic column is 1 to 20%, preferably 2 to 100%, most preferably 1.5 to 5%.

15. A method according to claim 1, wherein the pH of the pectin-containing solution introduced into the chromatographic column is less than 5, preferably less than 4, most preferably between 1.5 and 3.

16. A method according to claim 1, wherein the chromatographic separation is carried out at a temperature of 40 to 90° C., preferably 50 to 80° C., most preferably 65 to 80° C.

17. A method according to claim 1, wherein the method also comprises ion exchange treatment after the chromatographic fractionation.

18. A method according to claim 17, wherein the ion exchange treatment is carried out with a combination of a strong cation exchanger and a weak anion exchanger.

19. A method according to claim 1, wherein the method also comprises a step of membrane filtration before or after the chromatographic fractionation.

20. A method according to claim 19, wherein the membrane filtration utilizes ultrafiltration.

21. A method according to claim 20, wherein the ultrafiltration is carried out with a cut-off size of 1000 to 30 000 Da.

22. A method according to claim 1, wherein the method also comprises treatment with an adsorbent before or after the chromatographic fractionation.

23. A method according to claim 1, wherein the obtained pectin is modified chemically.

24. A method according to claim 23, wherein the pectin is cross-linked.

25. A method according to claim 1, wherein the obtained pectin solution is dried.

26. A method according to claim 1, wherein the pectin-containing vegetable material used as a raw material is obtained from sugar beet pulp.

27. A method according to claim 26, wherein the raw material is biologically preserved sugar beet pulp obtained by decreasing the pH of the pulp to a value of 3.5 to 4.5 and by storing the pulp in substantially oxygen-free conditions.

28. A method according to claim 1, wherein the pectin-containing vegetable material used as a raw material is obtained from citrus fruit or apples.

* * * * *